Nov. 17, 1925.

P. D. SCHENCK

VALVE

Filed Jan. 18, 1924

1,562,195

2 Sheets-Sheet 1

INVENTOR
Peirce D Schenck
by
James C Bradley
atty

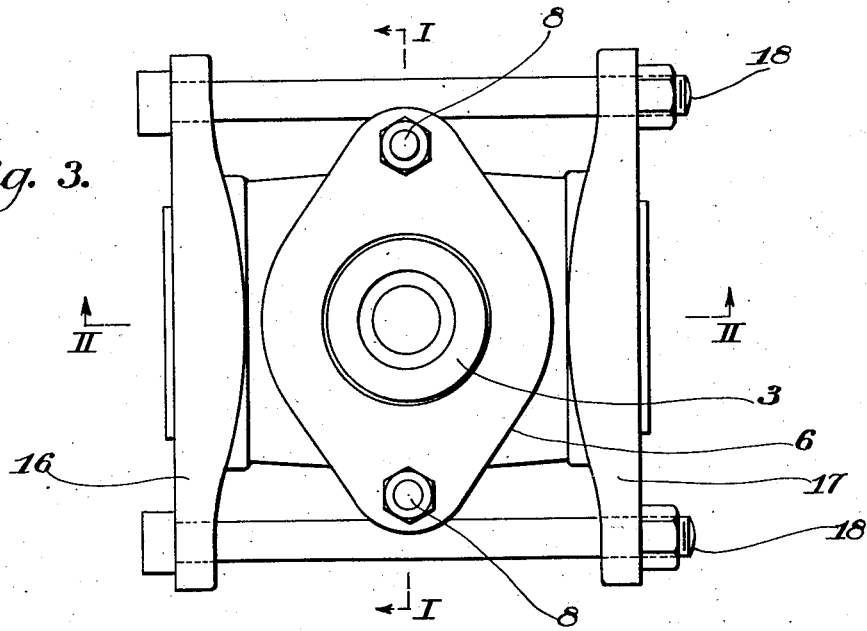
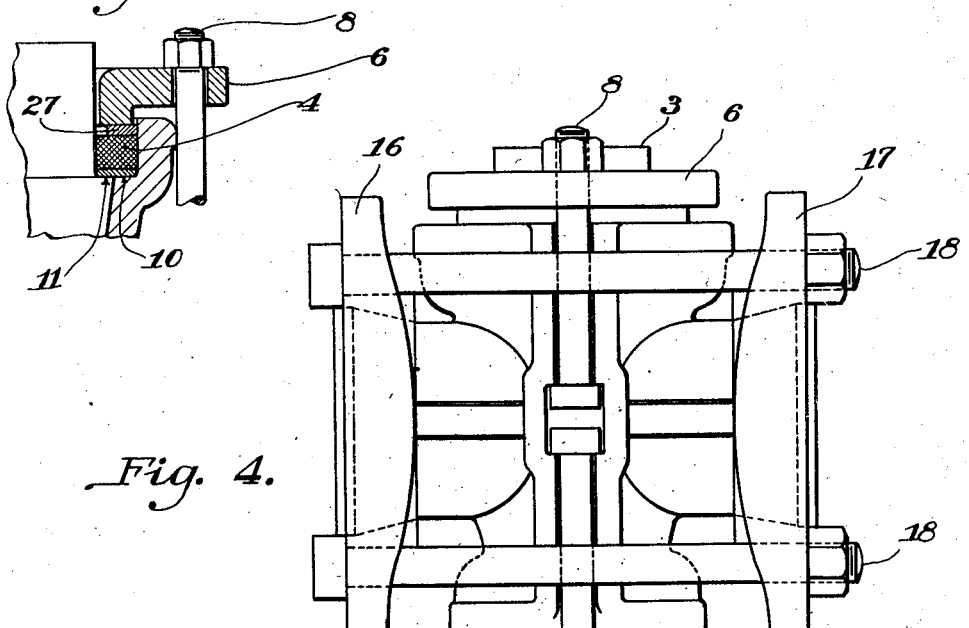

Patented Nov. 17, 1925.

1,562,195

UNITED STATES PATENT OFFICE.

PEIRCE D. SCHENCK, OF DAYTON, OHIO, ASSIGNOR TO THE DURIRON COMPANY, INC., A CORPORATION OF NEW YORK.

VALVE.

Application filed January 18, 1924. Serial No. 687,101.

*To all whom it may concern:*

Be it known that I, PEIRCE D. SCHENCK, a citizen of the United States, and a resident of Dayton, in the county of Montgomery and State of Ohio, have made a new and useful invention in Improvements in a Valve, of which the following is a specification.

Figure 1:
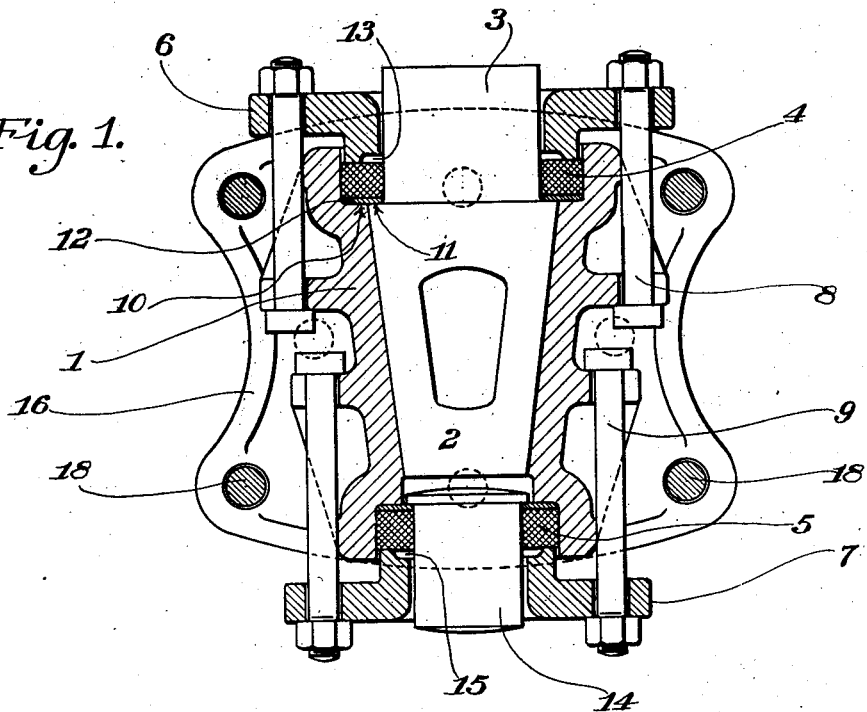
Figure 2:
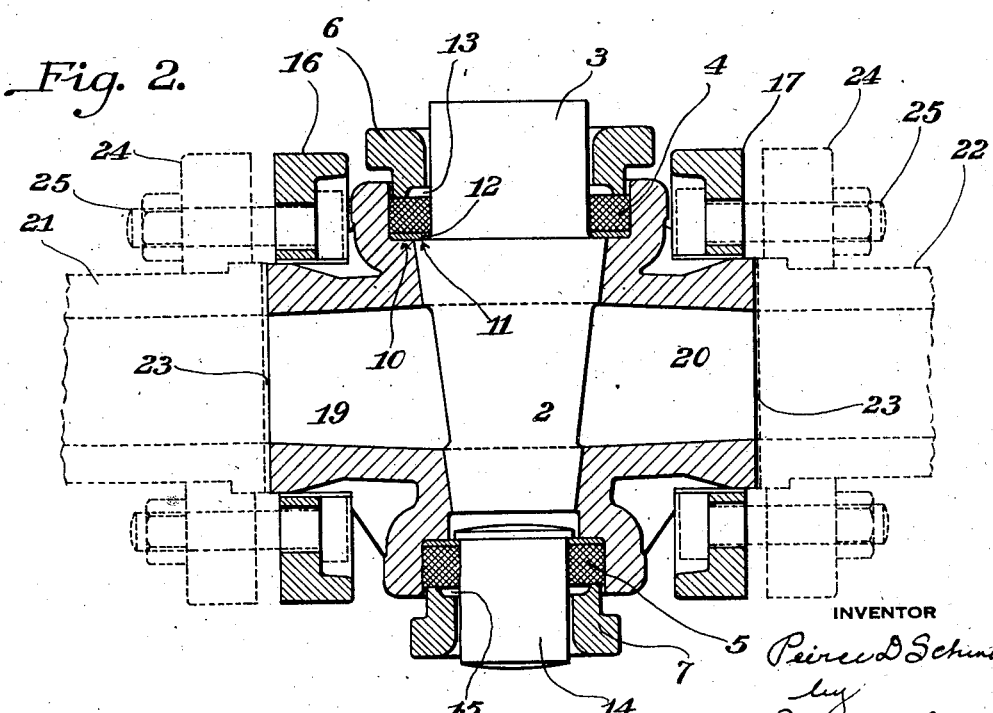

The invention relates to valves or stop cocks, and more particularly, to what are known as plug valves. The valve is designed for use with corrosive liquids requiring acid or alkali resisting compositions, which are hard and brittle, and lack in tensile strength, but certain features of the construction are of value in valves made of ordinary metals, and designed for use with non-corrosive liquids. The invention has for its principal objects; the provision of an improved plug valve packing construction adapted to apply pressure to the packing in such manner that a tight joint around the valve stem is secured without rendering the valve difficult to turn in its tapering seat; and the provision of a construction in which the valve body is protected from undue strain, particularly tensile strain, incident to the attachment of the valve to its pipe connections, this feature being of special utility where the valve body is of brittle corrosion resisting composition and of low tensile strength. Certain embodiments of the invention are illustrated in the accompanying drawings wherein:

Figure 1 is a vertical section through the valve on the line I—I of Fig. 3. Fig. 2 is a section through the valve at right angles to the section of Fig. 1 on the line II—II of Fig. 3, with the pipe connections for the valve shown in dotted lines. Figs. 3 and 4 are plan and side elevation views respectively of the valve. And Fig. 5 is a partial section through a modification.

Referring to the drawings, 1 is the valve body or casing preferably of corrosion resisting material, such as high silicon iron which is hard and brittle and of relatively low tensile strength. This body has the usual tapering seat, in which fits the valve plug 2, preferably of the same material as the valve body. The plug has a stem 3, to which an operating handle (not shown) may be applied. The body or casing is also provided at its ends with packing recesses carrying the packing 4 and 5 engaged by the followers 6 and 7, which are adjusted inward by the pairs of bolts 8, 8 and 9, 9. The bottom of the packing recess surrounding the stem 3 comprises the shoulder 10, formed in the casing, and the shoulder 11 at the upper end of the plug. A metal ring 12 is preferably employed intermediate the two shoulders and the packing 4. The inner end of the follower 6 is cut away as indicated at 13, so that all the pressure from the follower is applied in alignment with the shoulder 10, and only a slight amount of pressure is applied to the shoulder 11. As a result, the follower may be forced in tightly without pressing the plug down too tightly into its tapering seat, and thus rendering it difficult to turn. At the same time, the pressure of the follower tends to spread the packing laterally so that its pressure against the stem is sufficient to prevent leakage along the stem.

At the other end a plunger 14 is employed in opposition to the end of the plug 2, which plunger may be forced upward by impact, in order to loosen the plug, in case it becomes stuck in its seat. The follower construction is the same as that of the follower 6, the inner end being cut away as indicated at 15. When the follower 7 is tightened, the head of the plunger is out of contact with the lower end of the plug 2 as illustrated. If the plug becomes stuck, it may be loosened by striking the end of the plunger which in turn strikes the plug.

The valve body 1 is clamped between the pair of plates 16 and 17 by means of the four bolts 18, which are tightened, so as to apply a compressive stress upon the valve body and seat the plates very firmly against the sides of such body. These plates are of a tougher, stronger material than the body of the valve, such as cast steel or wrought metal. The valve body has the inlet and outlet passages 19 and 20, and in opposition to these passages, are the inlet and outlet pipes 21 and 22 with suitable gaskets 23 interposed between the ends of the pipes and the passages. In case the valve body is of corrosive resisting material, these pipes will preferably be of similar composition, and flanges 24 of stronger, tougher material similar to that of the clamping plates 16 and 17, will be employed, being preferably applied by means of bayonet joints. The flanges might also be made integral with the pipe, or might be threaded to the ends of the pipes, in case such pipes were of ordinary wrought iron or steel.

The flanges on the pipes are secured to the plates 16 and 17 in the construction illustrated, by means of the bolts 25, although any other suitable securing means might be employed such as stud bolts. Although four bolts are shown for clamping the plates 16 and 17 together and for clamping the plates to the flanges 24, a different member might be employed, and the spacing of the bolts arranged in other ways.

Fig. 5 illustrates a modification in which the pressure at the lower end of the follower 26 is localized above the shoulder 10 by the use of the ring 27 instead of by cutting the lower edge of the follower away as in the first form of construction.

The use of the construction for localizing the pressure by the follower above the shoulder 10 gives a valve in which the plug is readily turned and which, at the same time, is free from leakage. The plates 16 and 17 make the valve much stronger and safer, which is of special importance in handling corrosive liquids. The valve body is relieved of practically all tensile strains incident to pressure and to the temperature changes in the piping, the strain being transferred to the clamping plates which have sufficient strength to eliminate any danger of fracture. The provision of the plunger 14 arranged so that it may be driven upward against the plug gives a very positive means for loosening it in case it becomes stuck, as the plug may be loosened very easily and quickly by merely striking the plunger a light blow, and without loosening or tightening any bolts or nuts. Other advantages incident to the construction will be readily apparent to those skilled in the art.

What I claim is:

1. In combination in a plug valve, a valve casing having a tapering seat, and a packing recess terminating in a shoulder, a tapering plug fitting the seat and having a stem with a shoulder at the juncture of the plug and stem opposite said first shoulder in alignment therewith, a metal ring lying in said recess and engaging both of said shoulders, packing means filling the recess on the outer side of said ring, and a follower arranged to apply pressure to the packing at its outer portion, but out of contact therewith at its inner portion.

2. In combination in a plug valve, a valve casing having a tapering seat, and a packing recess terminating in a shoulder, a tapering plug fitting the seat and having a stem with a shoulder at the juncture of the plug and stem opposite said first shoulder in alignment therewith, a metal ring in said recess engaging both of said shoulders, packing means in the recess, and a follower having its packing engaging face cut away adjacent the stem, so as to apply pressure to that portion of the packing only which is opposite said first shoulder.

3. In combination, a valve body or casing open at both ends and provided with a tapering seat, a tapering plug fitting the seat and having a stem extending through the opening at one end of the casing, packing means for said stem, a packing recess at the other end of the casing having a shoulder at its inner end for engaging the packing means employed, packing means in said recess, and a plunger extending through the follower and packing and having a head at its inner end adapted to engage the inner end of the plug.

4. In combination, a valve body or casing open at both ends and provided with a tapering seat, a tapering plug fitting the seat and having a stem extending through the opening at one end of the casing, packing means for said stem, a packing recess at the other end of the casing having a shoulder at its inner end for engaging the packing means employed, packing means in said recess, and a plunger extending through the follower and packing and having a head at its inner end adapted to engage the inner end of the plug, said head being out of contact with the end of the plug when the follower is in operative position with the packing compressed between said shoulder and the follower.

5. In combination, an integral valve body of relatively brittle corrosion resisting metal having tubular inlet and outlet members projecting from opposite sides thereof, a valve in the body extending transversely of said members, a clamping plate on each side of the valve body of relatively strong, tough metal surrounding said inlet and outlet members, bolts extending between the two plates securing them together and clamping the valve body tightly therebetween, each of said plates being provided with perforations so that it may be bolted to the flange plate of an opposing pipe connection, and the ends of said inlet and outlet members projecting through said clamping plates to permit them to be brought into abutting relation with the ends of said pipe connections.

In testimony whereof, I have hereunto subscribed my name this 16th day of January, 1924.

PEIRCE D. SCHENCK.